(12) United States Patent
Ionescu et al.

(10) Patent No.: US 10,079,848 B2
(45) Date of Patent: *Sep. 18, 2018

(54) AUTO-TUNING SECURITY ANALYSIS TOOL CONFIGURATION VIA CORRELATION ANALYSIS

(71) Applicant: International Business Machines Corporation, Armonk, NY (US)

(72) Inventors: Paul Ionescu, Ottawa (CA); Iosif V. Onut, Ottawa (CA); Omer Tripp, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/888,201

(22) Filed: Feb. 5, 2018

(65) Prior Publication Data

US 2018/0139226 A1 May 17, 2018

Related U.S. Application Data

(63) Continuation of application No. 15/270,016, filed on Sep. 20, 2016.

(51) Int. Cl.
| | |
|---|---|
| *H04L 29/00* | (2006.01) |
| *H04L 29/06* | (2006.01) |
| *G06F 17/30* | (2006.01) |
| *G06F 21/57* | (2013.01) |

(52) U.S. Cl.
CPC .... *H04L 63/1425* (2013.01); *G06F 17/30598* (2013.01); *G06F 21/577* (2013.01); *G06F 2221/033* (2013.01)

(58) Field of Classification Search
CPC ........ G06F 3/0488; G06F 21/31; G06F 21/36; G06F 3/017
See application file for complete search history.

(56) References Cited

U.S. PATENT DOCUMENTS

| | | |
|---|---|---|
| 8,683,546 B2 | 3/2014 | Dunagan et al. |
| 8,701,198 B2 | 4/2014 | Greene et al. |
| 8,925,076 B2 | 12/2014 | Zaitsev |
| 9,544,327 B1 | 1/2017 | Sharma et al. |
| 2009/0178139 A1 | 7/2009 | Stute et al. |
| 2014/0075561 A1 | 3/2014 | Guarnieri et al. |
| 2014/0373157 A1 | 12/2014 | Guarnieri et al. |

(Continued)

OTHER PUBLICATIONS

Shin, Jaeho, "An Abstract Interpretation with the Interval Domain for C-like Programs", Research on Program Analysis System, National Creative Research Initiative Center 1998-2003, Programming Research Laboratory, School of Computer Science & Engineering, Seoul National University, Ropas Memo, 2006-32, Jul. 26, 2006, 34 pages. <http://ropas.snu.ac.kr/lib/dock/Sh2006.pdf>.

(Continued)

*Primary Examiner* — Ghazal Shehni
(74) *Attorney, Agent, or Firm* — Edward J. Wixted, III

(57) ABSTRACT

A configuration for a security analysis tool is received from a user. The configuration includes two or more configuration items. Each configuration item is a parameter in the configuration of the security analysis tool that has a plurality of possible values. A correlation between the two or more configuration items is determined. The correlation is based on one or more pre-determined empirical correlations.

1 Claim, 3 Drawing Sheets

(56) References Cited

U.S. PATENT DOCUMENTS

2015/0213369 A1    7/2015  Brandt et al.
2016/0344761 A1   11/2016  Ligman et al.

OTHER PUBLICATIONS

Wu et al., "Top 10 algorithms in data mining", Knowl Inf Syst (2008) 14:1-37, DOI 10.1007/s10115-007-0114-2, Survey Paper, Revised: Sep. 28, 2007 / Accepted: Oct. 8, 2007, Published online: Dec. 4, 2007, © Springer-Verlag London Limited 2007, 37 pages. ,http://www.cs.umd.edu/~samir/498/10Algorithms-08.pdf>.

"Sourcefire RNA® (Real-Time Network Awareness)", Dealing With Dynamic Threats, Technology Brief, © 2009 Sourcefire, Inc., www.sourcefire.com 08.09 | Rev 1, 6 pages. <http://www.ndm.net/ips/pdf/sourcefire/Sourcefire-RNA-Technology-Brief.pdf>.

Ionescu et al., "Auto-Tuning Security Analysis Tool Configuration via Correlation Analysis", U.S. Appl. No. 15/270,016, filed Sep. 20, 2016, 24 pages.

IBM, "List of Patent Applications Treated as Related", Appendix P, Dated Jan. 31, 2018, 2 pages.

AUTO-TUNING SECURITY ANALYSIS TOOL CONFIGURATION VIA CORRELATION ANALYSIS

BACKGROUND

The present invention relates generally to the field of security analysis, and more particularly to automatically tuning the configuration of security analysis tools based on correlation analysis.

Security analysis tools may be used to test an Internet application for security vulnerabilities during the development process of the application. Testing for security issues during development is beneficial as it is less expensive to fix such problems during development or before an application is released. The security analysis tools learn the behavior of each application being tested, whether an off-the-shelf application or an internally developed application, and develops a program intended to test all of the functions of the application for both general security issues and application-specific vulnerabilities.

SUMMARY OF THE INVENTION

Embodiments of the present invention include a method, computer program product, and system for automatically tuning the configuration of security analysis tools based on correlation analysis. In one embodiment, a configuration for a security analysis tool is received from a user. The configuration includes two or more configuration items. Each configuration item is a parameter in the configuration of the security analysis tool that has a plurality of possible values. A correlation between the two or more configuration items is determined. The correlation is based on one or more pre-determined empirical correlations.

DETAILED DESCRIPTION

Embodiments of the present invention provide for automatically tuning the configuration of security analysis tools based on correlation analysis. Security analysis tools are used to analyze Internet applications for security vulnerabilities during development when it is less expensive to fix any issues discovered by the analysis. The analysis of an application may be a complicated and difficult process based on the large number of lines of code that comprise the application. This large number of lines of code led to automated security analysis replacing human analysis. The automated analysis must perform deep semantic analysis of the lines of code to prevent missing any security vulnerabilities. Configuration of the automated security analysis tools is important to correctly perform the deep semantic analysis.

Embodiments of the present invention recognize that there may be a method, computer program product, and computer system for automatically tuning the configuration of security analysis tools based on correlation analysis. The method, computer program product, and computer system may use correlation data between different variables in the configuration (i.e., setup) of the security analysis tools to create an optimized configuration. The optimized configuration is applied to multiple instances of the application in order to determine less than optimal combinations of configuration variables.

The present invention will now be described in detail with reference to the Figures.

Figure 1:
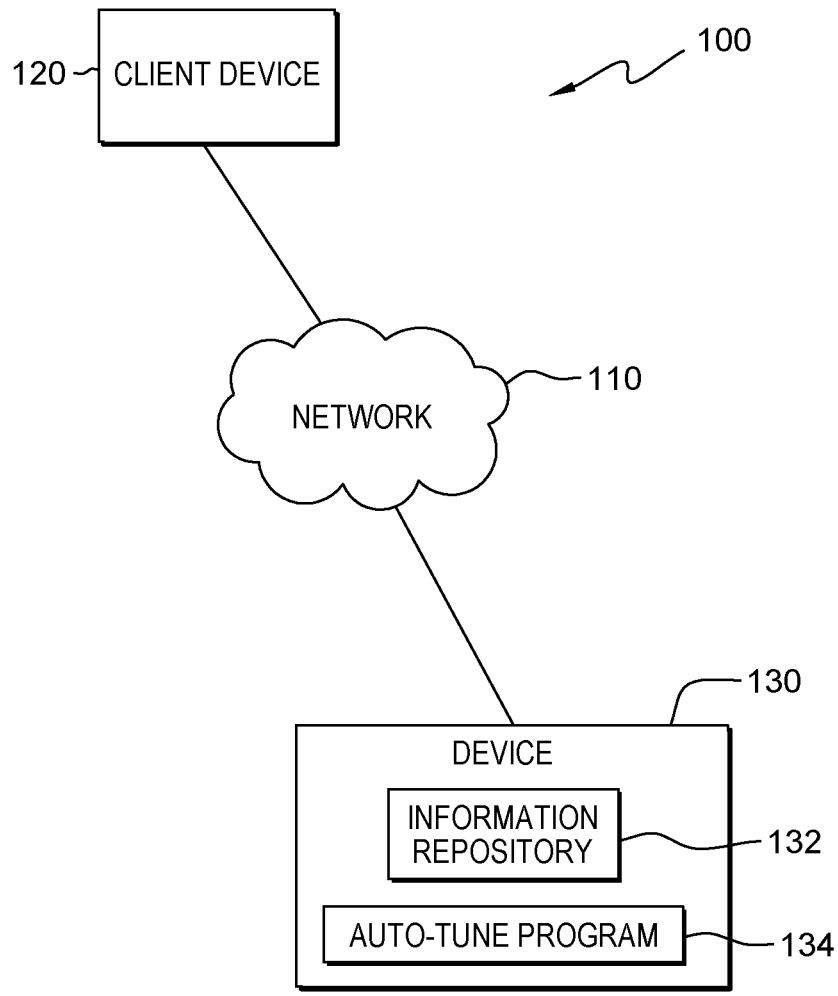
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120 and device 130 connected to network 110. In example embodiments, computing environment 100 may include other computing devices (not shown) such as smartwatches, cell phones, smartphones, wearable technology, phablets, tablet computers, laptop computers, desktop computers, other computer servers or any other computer system known in the art, interconnected with client device 120 and device 130 over network 110.

In example embodiments, client device 120 and device 130 may connect to network 110, which enables client device 120 and device 130 to access other computing devices and/or data not directly stored on client device 120 and/or device 130. Network 110 may be, for example, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between client device 120, device 130, and any other computing devices connected to network 110, in accordance with embodiments of the present invention. In an embodiment, data received by another computing device in computing environment 100 (not shown) may be communicated to client device 120 and device 130 via network 110.

In embodiments of the present invention, client device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, client device 120 represents a computer system utilizing clustered computers and components (e.g., database server computers, application server computers, etc.) that act as a single pool of seamless resources when accessed by elements of computing environment 100. In general, client device 120 is representative of any electronic device or combination of electronic devices capable of executing computer readable program instructions. Device 130 is substantially similar to client device 120. Computing environment 100 may include any number of client device 120 and device 130. Client device 120 and device 130 may include components as depicted and described in further detail with respect to FIG. 3, in accordance with embodiments of the present invention.

In an embodiment, device 130 includes information repository 132 and auto-tune program 134. According to embodiments of the present invention, information repository 132 may be storage that may be written to and/or read by auto-tune program 134. In one embodiment, information repository 132 resides on device 130. In another embodiment, information repository 132 resides on client device 120. In other embodiments, information repository 132 may reside on any other device (not shown) in computing environment 100, in cloud storage or on another computing device accessible via network 110. In yet another embodiment, information repository 132 may represent multiple storage devices within client device 120 and/or device 130.

In an embodiment, information repository 132 may be implemented using any volatile or non-volatile storage media for storing information, as known in the art. For example, information repository 132 may be implemented with a tape library, optical library, one or more independent hard disk drives, multiple hard disk drives in a redundant array of independent disks (RAID), solid-state drives (SSD), or random-access memory (RAM). Similarly, information repository 132 may be implemented with any suitable storage architecture known in the art, such as a relational database, an object-oriented database, or one or more tables. In an embodiment of the present invention, auto-tune program 134 and any other programs and applications (not shown) operating on client device 120 may store, read, modify, or write data to information repository 132. Examples of data stored to information repository 132 include pre-determined correlation rules based on development testing, previous analysis results of deployment runs on user workstations, and crowdsourcing of configuration rules.

According to embodiments of the present invention, auto-tune program 134 may be a program, a subprogram of a larger program, an application, a plurality of applications, or mobile application software, which functions to tune the configuration of security analysis tools automatically based on correlation analysis. A program is a sequence of instructions written by a programmer to perform a specific task. Auto-tune program 134 may run by itself but may be dependent on system software (not shown) to execute. In one embodiment, auto-tune program 134 functions as a stand-alone program residing on device 130. In another embodiment, auto-tune program 134 may be included as a part of client device 120. In yet another embodiment, auto-tune program 134 may work in conjunction with other programs, applications, etc., found on device 130 or in computing environment 100. In yet another embodiment, auto-tune program 134 may be found on other computing devices (not shown) in computing environment 100 which are interconnected to device 130 via network 110.

According to embodiments of the present invention, auto-tune program 134 functions to tune the configuration of security analysis tools automatically based on correlation analysis. According to an embodiment of the present invention, auto-tune program 134 uses pre-determined, empirical correlation rules stored to a repository to provide an optimized configuration for a security analysis tool.

In an embodiment, the empirical correlations are determined using the Apriori data-mining algorithm. The Apriori algorithm generates correlations between items of an input database, DB. In an embodiment, DB includes a plurality of configuration items (p) and a plurality of possible values (v) for each of the plurality of configuration items resulting in a database that ranges over all possible pairs (p,v). DB is also populated with raw configuration data from a large set of known effective configurations, which are available from any number of existing security analysis tools known in the art. The Apriori algorithm is then applied to DB. The Apriori algorithm performs a breadth-first search to search through all possible (p,v) pairs up to a pre-set upper limit if the number of pairs is prohibitively large. A breadth-first search is an algorithm for searching graph data structures that starts at a root and explores neighbor nodes before moving to next level neighbors. This application of the Apriori algorithm yields a set of association rules for the (p,v) pair combinations, which can then be applied to a user-generated configuration of a security analysis tool to identify possible security issues with the user-generated configuration.

Figure 2:
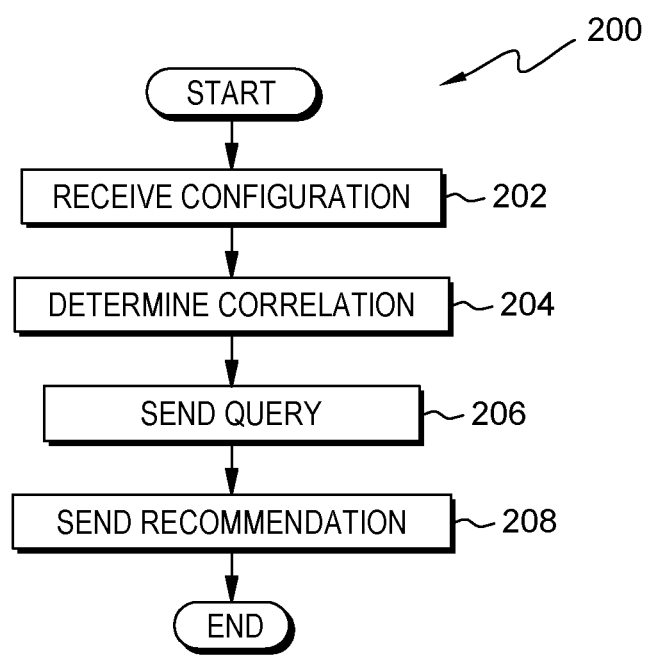
FIG. 2 depicts a flowchart of a program for automatically tuning the configuration of security analysis tools based on correlation analysis, in accordance with an embodiment of the present invention.

FIG. 2 is a flowchart of workflow 200 depicting a method for automatically tuning the configuration of security analysis tools based on correlation analysis. In one embodiment, the method of workflow 200 is performed by auto-tune program 134. In an alternative embodiment, the method of workflow 200 may be performed by any other program working with auto-tune program 134. In an embodiment, a user, via a user interface (not shown), may invoke workflow 200 upon the user starting one or more applications on a computing device. In an alternative embodiment, a user may invoke workflow 200 upon accessing auto-tune program 134.

In an embodiment, auto-tune program 134 receives a configuration (step 202). In other words, auto-tune program 134 receives a configuration for a security analysis tool for analysis of an application. According to one embodiment of the present invention, the configuration for the security analysis tool is received from a user. According to another embodiment of the present invention, the configuration for the security analysis tool is received from a repository. According to yet another embodiment, the configuration for the security analysis tool is received from an auto-configuration tool. In an embodiment, the configuration of the security analysis tool includes one or more configuration items. In an embodiment, a configuration item is a parameter in a security analysis tool configuration that has a plurality of possible values. Example configuration items include case sensitive uniform resource locators (URLs), in-session detection, automatic form fill requirements, parameters and paths being tracked, and the like, which are stored to information repository 132 on device 130. For example, "Joe", who is using a personal computer, provides a configuration for a security analysis tool that prioritizes checking case sensitive URLs over automatic form fill requirements.

In an embodiment, auto-tune program 134 determines correlations (step 204). In other words, auto-tune program 134 determines correlations between two or more configuration items in the received configuration (step 202) and provides an optimized configuration to the user. According to an embodiment of the present invention, auto-tune program 134 uses pre-determined empirical correlations, which are stored to a repository, to determine correlations of the configuration items in the received configuration of the security analysis tool and to provide an optimized configuration to a user based on the pre-determined empirical correlations. In an embodiment, auto-tune program 134 retrieves pre-determined correlations from information repository 132 on device 130 and uses the pre-determined correlations to determine the correlations of the received configuration for the security analysis tool. For example, a program informs "Joe" that based on the pre-determined empirical correlations derived from the Apriori algorithm (previously discussed), automatic form fill requirements should be prioritized over checking case sensitive URLs.

In an embodiment, auto-tune program 134 sends a query (step 206). In other words, auto-tune program 134 sends a query to a user requesting that the user identify a priority of the configuration items in the received configuration. In an embodiment, based on the input received from the user, auto-tune program 134 determines effective combinations for the values of the prioritized configuration items based on the pre-determined empirical correlations stored to a repository. In an embodiment, auto-tune program 134 sends a query to a user of client device 120 and subsequently receives an input from the user of client device 120 indicating a priority of the configuration items in the received configuration. In the embodiment, based on the input from the user and the pre-determined empirical correlation data stored to information repository 132 on device 130, auto-tune program 134 determines effective configuration item values for the prioritized configuration items indicated by the user. For example, "Joe" receives a query on the personal computer being used by "Joe" from a program requesting that "Joe" identify a priority of the configuration items in the configuration of a security analysis tool. Due to the query, "Joe" sends an input to the program identifying that checking case sensitive URLs is a higher priority than checking automatic form fill requirements. Based on the input from "Joe" and the available pre-determined empirical correlation data, the program determines effective values for the two configuration items.

In an embodiment, auto-tune program 134 sends a recommendation (step 208). In other words, auto-tune program 134 sends a recommendation of the determined effective values to the user for the user prioritized configuration items. In an embodiment, auto-tune program 134 on device 130 sends a recommendation of effective values for the configuration items prioritized by a user of client device 120 to the user. For example, a recommendation of effective values for the configuration items prioritized by "Joe" is sent to "Joe" on the personal computer being used by "Joe".

Figure 3:
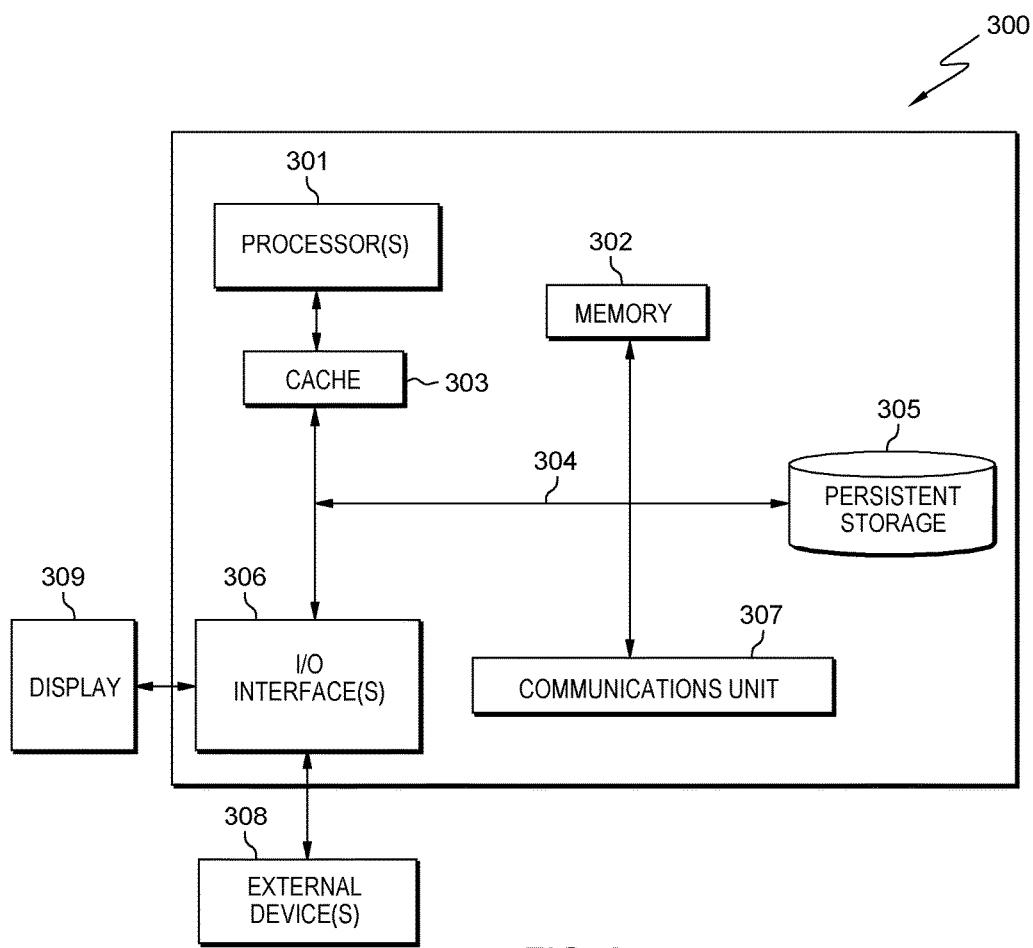
FIG. 3 depicts a block diagram of components of the computing environment of FIG. 1, in accordance with an embodiment of the present invention.

FIG. 3 depicts computer system 300, which is an example of a system that includes auto-tune program 134. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for automatically tuning a configuration of a security analysis tool based on a correlation analysis, the method comprising:

receiving, by one or more computer processors, a configuration from a user for the security analysis tool, wherein:

the configuration includes two or more configuration items;

the security analysis tool is used to analyze an Internet application for security vulnerabilities during development of the Internet application;

each configuration item is a parameter, in the configuration of the security analysis tool, that has a plurality of possible values; and each configuration item is selected from the group consisting of case sensitive uniform resource locators (URLs), in-session detection, automatic form fill requirements, parameters and paths being tracked;

determining, by the one or more computer processors, a correlation between the two or more configuration items in the received configuration from the user, wherein the correlation between the two or more configuration item is based on one or more pre-determined empirical correlations, wherein:

the one or more pre-determined empirical correlations are derived from an Apriori algorithm;

the Apriori algorithm generates correlations between two or more items of an input database;

the input database includes a plurality of configuration items (p) and a plurality of possible values (v) for each of the plurality of configuration items resulting in a database that ranges over all possible values of (p,v);

the Apriori algorithm performs a breadth-first search through all possible values of (p,v) that yields a set of association rules for the (p,v) pair combinations; and the breadth-first search is an algorithm for searching graph data structures that starts at a root and explores neighbor nodes before moving to next level neighbors;

providing, by the one or more computer processors, an optimized configuration of the two or more configuration items in the received configuration to the user based on the determined correlation between the two or more configuration items in the received configuration;

sending, by the one or more computer processors, a query to the user requesting a priority of the two or more configuration items in the received configuration;

receiving, by the one or more computer processors, an input from the user indicating the priority of the two or more configuration items in the received configuration; and sending, by the one or more computer processors, a recommendation to the user, wherein the recommendation includes one or more configuration item values for each configuration item of the two or more configuration items based on the pre-determined empirical correlations and the indicated priority of the two or more configuration items.

* * * * *